United States Patent [19]

Ward et al.

[11] 4,210,411
[45] Jul. 1, 1980

[54] SELF-RECUPERATIVE BURNER

[76] Inventors: Trevor Ward; Clive Ward, both of Little Royd Mill, Low Road, Earlsheaton, Dewsbury, Yorkshire, England

[21] Appl. No.: 871,063

[22] Filed: Jan. 20, 1978

[30] Foreign Application Priority Data

Jan. 21, 1977 [GB] United Kingdom ............. 2445/77

[51] Int. Cl.² .................................... F23D 11/44
[52] U.S. Cl. ................................ 431/160; 431/215; 239/423
[58] Field of Search .............. 431/188, 187, 215, 216, 431/160, 166, 174, 89, 189, 186, 12; 239/423, 397.5

[56] References Cited

U.S. PATENT DOCUMENTS

| | | | |
|---|---|---|---|
| 2,385,153 | 9/1945 | Morton | 431/186 |
| 2,487,959 | 11/1949 | Zink | 431/186 |
| 2,815,069 | 12/1957 | Garraway | 431/188 |
| 3,101,773 | 8/1963 | Blaha | 431/166 |
| 3,163,202 | 12/1964 | Schmidt et al. | 431/215 |
| 3,212,558 | 10/1965 | Williams | 431/215 |
| 3,262,484 | 7/1966 | Hess | 431/215 |
| 3,420,614 | 1/1969 | Ward | 431/215 |
| 4,038,022 | 7/1977 | Blackman | 431/215 |
| 4,125,359 | 11/1978 | Lempa | 239/397.5 |

FOREIGN PATENT DOCUMENTS

| | | | |
|---|---|---|---|
| 223729 | 10/1962 | Fed. Rep. of Germany | 431/215 |
| 1248912 | 10/1971 | United Kingdom | 431/215 |
| 1314025 | 4/1973 | United Kingdom | 431/215 |
| 1332125 | 10/1973 | United Kingdom | 431/215 |

Primary Examiner—Samuel Scott
Assistant Examiner—Wesley S. Ratliff, Jr.
Attorney, Agent, or Firm—Sprung, Felfe, Horn, Lynch & Kramer

[57] ABSTRACT

A self recuperative burner which can be fired with oil or gaseous fuel or both. The oil feed pipe is surrounded by a passage through which compressed air or fuel gas is conveyed to the burner head in such a way that it reduces the tendency for the oil to overheat. Additional cooling means are provided for the oil feed pipe. The burner has a burner head which is supported by a tubular part carried by a common wall between the combustion air supply passage and the combustion products exhaust passage, there being a sliding joint between the burner head and the tubular part which provides a circumferential series of arcuate gaps around the periphery of the burner head for the flow of combustion air between the burner head and the tubular part. The burner has an exhaust flue which is surrounded by a tubular part in which the combustion air inlet port is formed, the flue being cooled by incoming combustion air.

21 Claims, 5 Drawing Figures

SELF-RECUPERATIVE BURNER

This invention relates to self recuperative fluid fuel burners particularly but not exclusively for the heating of furnaces in the temperature range above 800° C.

According to one aspect of this invention there is provided a self recuperative fluid fuel burner including fluid fuel supply means adapted to supply fluid fuel to a zone for combustion within the zone, heat exchange means comprising means defining juxtaposed passage systems for bringing two fluid streams into heat exchange relationship with one another, air supply passage means adapted to convey air via one of the juxtaposed passage systems of the heat exchange means to said zone to support combustion within that zone of fluid fuel supplied to that zone, and exhaust passage means for conveying away from said zone products of combustion within that zone, said exhaust products of combustion through another of the juxtaposed passage systems of said heat exchange means whereby air supplied to said zone by said air supply passage means is heated within the burner before reaching said zone by heat exchange in said heat exchange means with products of combustion within said zone; wherein the fluid fuel supply means comprise means for conveying liquid fuel to the combustion zone and means adjacent the combustion zone for presenting liquid fuel so conveyed to the combustion zone in a form which is suitable for combustion within the combustion zone.

Preferably the fluid fuel supply means include passage means that extend through the burner to said zone, the liquid fuel conveying means and the liquid fuel presenting means being located within said passage means which are adapted to convey gaseous fuel to said zone for combustion within said zone. Hence a burner which embodies this feature could be fired with gaseous fuel at the same time as or before or after it is fired with liquid fuel. Such a feature is particularly usefuel in that it enables an operator to choose to burn either gaseous or liquid fuel according to the prevailing cost of the two fuels. A preferred form of burner in which this aspect of this invention is embodied is arranged so that the liquid fuel conveying means and the liquid fuel presenting means are located removably within said passage means, said passage means being adapted to convey gaseous fuel to said zone when the liquid fuel conveying means and the liquid fuel presenting means are removed from said passage means.

In practice the liquid fuel presenting means comprise means for atomising liquid fuel fed to the zone. The atomising means may comprise an atomiser and means for directing a stream of compressed air past the atomiser. Conveniently the atomiser is fitted to an end of a liquid fuel feed pipe which is the liquid fuel conveying means and the fluid fuel supply means include means which form an annular passage around the liquid fuel feed pipe, the means for directing a stream of compressed air past the atomiser being adapted to direct that stream along the annular passage towards the atomiser.

It is desirable for the fluid fuel supply means to include means for conveying heat away from the liquid fuel conveying means for many applications of a self recuperative burner in which this aspect of this invention is embodied. Conveniently the means for conveying heat away from the liquid fuel conveying means comprise a tubular body which has a hollow wall and which is associated with the liquid fuel conveying means such that liquid fuel conveyed to the combustion zone is so conveyed through the bore of the tubular body, the hollow wall of the tubular body being divided interiorly into inner and outer annular spaces which communicate with one another at the end of the tubular body that is nearer to said zone, there being means for introducing fluid coolant into the inner annular space at a location remote from said end of the tubular body and means for exhausting such fluid coolant from the outer annular space at another location remote from said end of the tubular body. A suitable fluid coolant is air and conveniently air for that purpose may be taken from the same source as is air that is conveyed to said zone by said air supply passage means when the burner is in use. The tubular body may comprise said means which form said annular passage around the liquid fuel feed pipe. Preferably the tubular body is a sliding fit within said passage means and is assembled with the liquid fuel feed pipe to form a unitary removable liquid fuel feed lance assembly.

A conventional self recuperative burner can be converted from being a gas fired burner to being a burner which is fired by liquid fuel, such as oil, by being fitted with a suitable removable liquid fuel feed lance assembly.

Preferably the passages of said heat exchange means, said air supply passage means and said exhaust passage means are formed by an assembly of substantially concentric tubes, one of the tubes forming a common wall between the exhaust passage means and the air supply passage means which comprise the juxtaposed passage systems of said heat exchange means. The burner may include a burner head which is adapted to effect intermixing of air and fuel fed to said zone to facilitate combustion within said zone means for supporting and locating the burner head adjacent said zone including means forming a sliding joint between the burner head and a tubular part carried by said one tube whereby relative axial movement between the head and said one tube is permitted. Conveniently the common wall formed by said one tube comprises the radially outer wall of the air supply passage means and the radially inner wall of the exhaust passage means, and said tubular part surrounds said burner head. Preferably said means forming said sliding joint include spacers which are spaced angularly around an annular gap which is formed between the outer periphery of the burner head and said tubular part, each of the spacers being fixed to one of the burner head and said tubular part and being engaged slidably with the other of the burner head and said tubular part, the group of angularly spaced gaps between the spacers being in communication with the air supply passage means of which said one tube is the radially outer wall so that, when the burner is in operation, part of the air supply to said zone conveyed by said air supply passage means is directed through said group of angularly spaced gaps. This leads to the burner head, said tubular part, and at least the adjacent portion of said one tube being cooled by such air flow through said group of angularly spaced gaps. Preferably, where the fluid fuel supply means include passage means which extend through the burner to said zone, the liquid fuel conveying means and the liquid fuel presenting means being located within said passage means, one of said burner head and said tubular part carries a valve which co-operates with a corresponding portion of the other of said burner head and said tubular part to throttle air flow from said air supply passage means through said group of angularly spaced gaps, the arrangement being such that the restriction of such air flow through the group of angularly spaced gaps provided by the throttling action of said valve and the co-operating portion reduces as the temperature differential between said passage means and said one tube increases. This arrangement has two advantageous effects. Firstly air flow through said group of angularly spaced gaps increases as said temperature differential increases with consequent increase in the cooling effect of such air flow. Secondly the tendency for pressure to increase in the burner is less marked as said temperature differential increases, which is desirable. Conveniently the valve comprises an annular part which is carried by the burner head and which projects radially outwardly from the outer periphery of the burner head, and the co-operating part comprises an annular surface formed by an adjacent end of said tubular part. Manually operable means may be provided for adjusting the relative locations of said valve and said co-operating part. Conveniently at least part of said zone is formed by part of an aperture in a support body for the burner head, said tubular part being a sliding fit in another part of that aperture. The support body may be formed of a refractory material.

The exhaust passage means of a preferred form of self recuperative burner in which this aspect of this invention is embodied terminate in an exhaust flue through which the waste products of combustion are discharged from the burner and said air supply passage means include an inlet through which fresh air for conveyance to said zone is introduced into the burner. Preferably said fresh air inlet is formed in the outer wall of an annular chamber which surrounds the exhaust flue so that the exhaust flue is cooled by fresh air introduced into the annular chamber through said inlet. Where the passages of said heat exchange means, said air supply passage means and said exhaust passage means are formed by an assembly of substantially concentric tubes, one of the tubes forming a common wall between the exhaust passage means and the air supply passage means which comprise the juxtaposed passage systems of said heat exchange means, the annular chamber may be formed by the tubular body which surrounds the exhaust flue and which is fitted removably to said assembly so that it can be replaced by another tubular body of different axial length whereby the overall length of the heat exchange path between the air supply passage means and the exhaust passage means can be varied to suit different requirements. Additionally or alternatively, where the common wall is the radially inner wall of the exhaust passage means and the radially outer wall of the air supply passage means, the end of the assembly of tubes that leads to said zone may be encased in a block of refractory material, the remainder of said assembly of tubes projecting outwardly from the block of refractory material and carrying said exhaust flue. The outer surface of said remainder may be formed by a cylindrical casing from which the annular chamber projects radially and which forms an annular space around the outer wall of that part of the exhaust passage means which extends between the block of refractory material and the exhaust flue, the interior of the annular chamber being in communication with the annular space and there being baffle means within said annular space which cause air which enters said annular space to flow towards said block of refractory material and to circulate about that part of the exhaust passage means that extends between the block of refractory material and the exhaust flue before entering that part of the air supply passage means that run within said one tube through the end of said one tube that is remote from said zone and which is on the opposite side of the exhaust flue from said body of refractory material.

According to a further aspect of this invention there is provided a method of operating a burner comprising passing combustion air along passage means of the burner to a combustion zone of the burner, burning liquid fuel in said air in the combustion zone and transferring heat from products of such combustion to said air passing along said passage means so as to increase the heat output of the burner.

Preferably the method includes the step of conveying heat away from liquid fuel which is being conveyed through the burner to the combustion zone to be burnt in the combustion zone.

According to yet another aspect of this invention there is provided a self recuperative fluid fuel burner including a burner head adjacent a combustion zone, an assembly of tubes which form passages for conveying air and fuel separately to the burner head which is adapted to effect intermixing of air and fuel fed to it to facilitate combustion of that fuel within that air in the combustion zone, one of the tubes forming the radially outer wall of one of the passages which is adapted to convey combustion air to the burner head and the radially inner wall of another of the passages which is an exhaust passage for conveying a stream of products of combustion within the combustion zone through the burner, and means for supporting and locating the burner head adjacent the combustion zone including means forming a sliding joint between the burner head and a tubular part which is carried by said one tube whereby relative axial movement between the head and said tubular part is permitted, the arrangement being such that combustion air flowing through said one passage to the burner head is heated by heat transfer through said common wall from the stream of combustion products flowing through the other passage, wherein said means forming said sliding joint include spacers which are spaced angularly around an annular gap which is formed between the outer periphery of the burner head and said tubular part, each of the spacers being fixed to one of the burner head and said tubular part and being engaged slidably with the other of the burner head and said tubular part, the group of angularly spaced gaps between the spacers being in communication with said one passage so that, when the burner is in operation, part of the air supply to the combustion zone via said one passage is directed through said group of angularly spaced gaps.

According to yet a further aspect of this invention there is provided a self recuperative fluid fuel burner including fluid fuel supply means adapted to supply fluid fuel to a zone for combustion within that zone, heat exchange means comprising means defining juxtaposed passage systems for bringing two fluid streams into heat exchange relationship with one another, air supply passage means adapted to convey air via one of the juxtaposed passage systems of the heat exchange means to said zone to support combustion within that zone of fluid fuel supplied to that zone and including an inlet through which fresh air for conveyance to said zone is introduced into the burner, and exhaust passage means for conveying away from said zone products of combustion within that zone, said exhaust passage means terminating in an exhaust flue through which products of combustion are discharged from the burner and being adapted to convey such products of combustion through another of the juxtaposed passage systems of said heat exchange means whereby air supplied to said zone by said air supply means is heated within the burner before reaching said zone by heat exchange in said heat exchange means with products of combustion within said zone; wherein said fresh air inlet is formed in the outer wall of an annular chamber which surrounds the exhaust flue so that the exhaust flue is cooled by fresh air introduced into the annular chamber through said inlet.

One embodiment of this invention will be described now by way of example with reference to the accompanying drawings of which.

The burner 10 shown in the drawings has a tubular body 11 of refractory material at one end, a burner head 12 which is supported within the tubular body 11 adjacent the end of that body 11 that forms said one end of the burner 10, an assembly 13 of substantially concentric tubes or pipes which project substantially coaxially from the other end of the tubular body 11 and which are for conveying combustion air and either liquid or gaseous fuel to the burner head 11, and a tubular exhaust flue 14 which projects from that part of the assembly 13 that is outside the tubular body 11.

Figure 1:
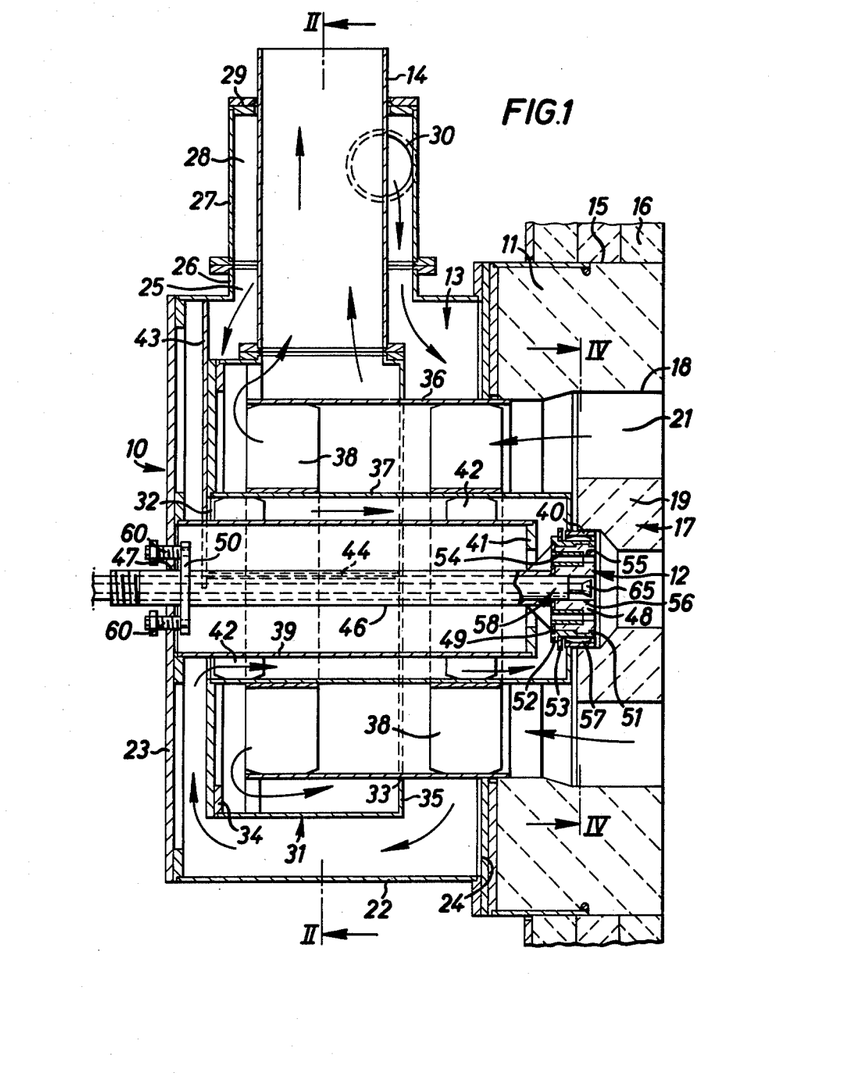
FIG. 1 is a longitudinal section through a self recuperative burner in which the present invention is embodied, the burner being set in a furnace wall.
Figure 2:
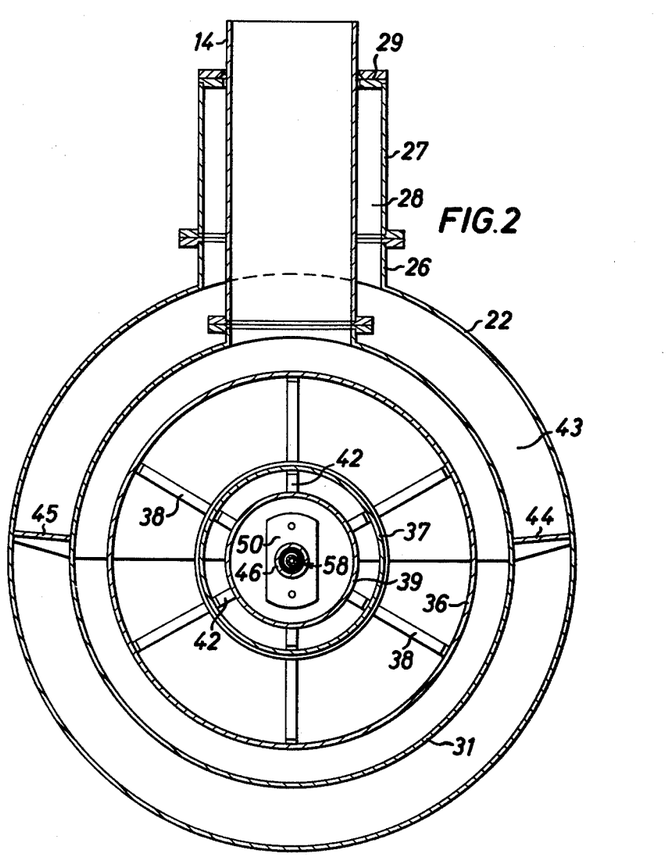
FIG. 2 is a section through the burner on the line II—II in FIG. 1.
Figure 3:
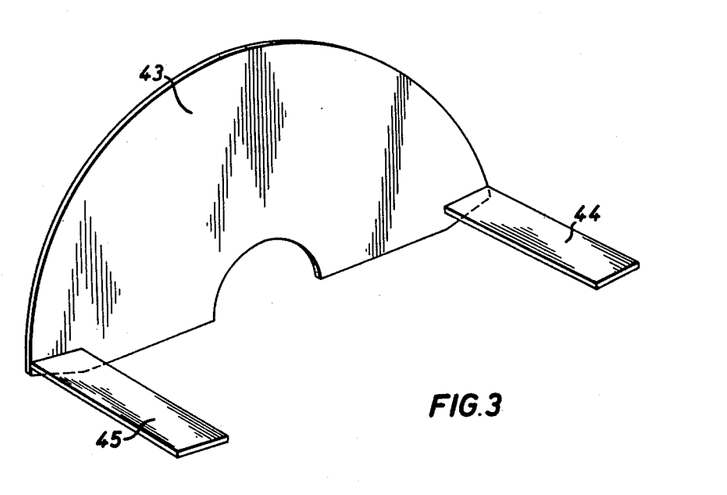
FIG. 3 is a perspective view of a detail of the burner shown in FIGS. 1 and 2.

The tubular refractory body 11 is spigotted into a circular aperture 15 which is formed in a vertical furnace wall so that part of the burner 10, including the flue 14, projects outwardly from the aperture away from the interior of the furnace. Only a few of the bricks 16 of the wall are shown in FIG. 1 for the sake of convenience. The axis of the aperture 15 is substantially horizontal. The bore of the body 11 is rebated at its end which is adjacent the inner end of the aperture 15. A support body 17 of refractory material is located within the rebated end portion 18 of the aperture 15. The support body 17 comprises a main annular portion 19 and four castellations 21, the main portion 19 having a right-cylindrical outer surface from which the castellations 21 project into contact with the surface of the rebated aperture end portion 18. The bore of the support body 17 is rebated at its end which is further from the inner end of the aperture 15.

The assembly 13 comprises a cylindrical outer casing 22 which is wholly outside the aperture 15. The diameter of the casing 22 is greater than that of the rebated end portion 18. The casing 22 is closed at its outer end by an end plate 23 and has an annular end plate 24 at its other end. The annular end plate 24 abuts the outer end face of the refractory body 11 and has an inside diameter substantially equal to that of the smaller diameter portion of the bore of the tubular body 11. The outer casing 22 has a circular aperture 25 formed in its upper surface and a cylindrical boss 26 which projects upwardly from the casing 22 and surrounds the aperture 25. The diameter of the circular aperture 25 is greater than that of the exhaust flue 14 that projects through it. A tubular casing 27 is connected at one end to the cylindrical boss 26 and projects upwardly from that boss 26 to form an annular chamber 28 which surrounds the exhaust flue 14 and communicates with the interior of the outer casing 22 via the circular aperture 25. The upper end of the tubular casing 27 is closed by an annular plate 29 which surrounds the flue 14 with a small clearance therearound. The flue 14, the tubular casing 27 and the cylindrical boss 26 are substantially coaxial. A horizontal air inlet port 30 is formed in the tubular casing 27.

The exhaust flue 14 projects upwardly and radially from a cylindrical drum 31 which is supported within the outer casing 22. The distance between the axis of the flue 14 and the end of the drum 31 that is nearer to the refractory body 11 is less than the radius of the circular aperture 25 whilst the distance between that axis and the other end of the drum 31 is greater than that radius. A circular aperture 32, 33 is formed concentrically in either end plate 34, 35 of the drum 31. The aperture 33 that is formed in the end plate 35 that is nearer to the refractory body 11 has a greater diameter than does the aperture 32 that is formed in the other end plate 34.

An outer metal tube 36 is fitted into and extends through the aperture 33 of the drum 31 as well as the central aperture of the annular end plate 34. One end of the outer tube 36 is spigotted into the bore of the refractory body 11. The other end of the outer tube 36 is spaced from the end plate 34 of the drum 31 by a distance which is less than the distance between that end plate 34 and the flue 14. Another metal tube 37 extends through the outer tube 36 and projects from the outer tube 36 at either end. The longer metal tube 37 has an inwardly directed annular flange at its end that is within the refractory body 11. A short tube 40 is spigotted into the central aperture of the annular flange of the longer tube 37 so that it projects from both sides of that flange, the flange being nearer to the end of the short tube 40 that is nearer to the drum 31. Hence the short tube 40 comprises a tubular part which is carried by the longer tube 37. The major portion of the short tube 40, that extends from the annular flange of the longer tube 37 in the direction away from the drum 31, is a sliding fit within the rebated bore portion of the support body 17 which thereby locates the short tube 40 as well as the longer tube 37. The diameter of the longer tube 37 is less than the diameter of the right cylindrical outer surface of the support body 17. Spacers 38 which are in sliding contact with the inner surface of the outer tube 36 and which are arranged in axially spaced groups, the spacers 38 of each group being spaced from one another angularly and being carried by a respective mounting sleeve which itself is fitted tightly around the longer tube 37, help to locate the two tubes 36 and 37 one relative to the other so that an annular passage is formed between the two tubes 36 and 37, whilst relative movement between the two tubes 36 and 37 in the longitudinal direction due to differential thermal expansion is permitted. One end of the annular passage that is formed between the two tubes 36 and 37 communicates with the interior of the furnace through the aligned annular passage that is formed between the tube 37 and the bore of the refractory body 11 and through the four arcuate spaces that are formed between the rebated aperture end portion 18 and the right cylindrical outer surface of the main body portion 19 by the castellations 21. The other end of the annular passage that is formed between the two tubes 36 and 37 communicates with the flue 14 via the space between the outer tube 36 and the end plate 34 of the drum 31.

A third metal tube 39 is supported at one end by the end plate 23 and projects into the interior of the aforesaid longer tube 37 (hereinafter identified as the middle tube 37) so as to form another annular passage. The end of the third tube 39 that is remote from the end plate 33 carries an inwardly directed radial flange 41 and is adjacent to, but is spaced from the short tube 40. The diameter of the third tube 39 is substantially equal to that of the short tube 40. Spacers 42, which are fixed to the third metal tube 39 and which are in sliding contact with the inner surface of the middle tube 37, maintain the separation of the two tubes 37 and 39 whilst permitting relative movement between them in the longitudinal direction due to differential thermal expansion.

A sheet metal baffle comprises a flat arcuate portion 43 and two substantially parallel sided flat limbs 44 and 45 (see FIGS. 2 and 3) and is located within the annular space that is formed within the cylindrical outer casing 22 around the cylindrical drum 31. The arcuate baffle portion 43 has an inside diameter which is substantially equal to the outside diameter of the outer tube 36, an outside diameter which is substantially equal to the inside diameter of the outer casing 22, lies in a substantially vertical plane and abuts the end plate 34 at the end of the drum 31 which is nearer to the end plate 23, and extends over the top of the third tube 39 with its ends in or adjacent to the horizontal plane that includes the axis of the third tube 39. Hence the upper half of the annular space between the drum 31 and the casing 32 is closed at the end of the drum 31 adjacent the end plate 23 by the arcuate baffle portion 43. The limb 44 is joined to the arcuate baffle portion 43 adjacent one end of that portion 43 and the limb 45 is joined to the arcuate baffle portion 43 adjacent the other end of that portion 43. Each limb 44, 45 is normal to the plane of the arcuate baffle portion 43 and extends from the arcuate baffle portion 43 within the annular space formed between the outer casing 22 and the drum 31 for a distance which is substantially equal to the axial length of the drum 31. The width of each limb 44, 45 is such that one of its longitudinal edges contacts the outer surface of the drum 31 and its other longitudinal edge touches the inner surface of the outer casing 22. Hence the upper part of the annular space that surrounds the drum 31 is separated from the lower part of that annular space by the two baffle limbs 44 and 45 which extend one on either side of the drum 31.

The burner head 12 is carried by a fluid fuel supply pipe 46 at one end of that pipe 46, the pipe 46 extending in a fluid tight manner through an aperture 47, which is formed centrally within the end plate 23, and through the central aperture of the radial flange 41. The head 12 comprises a cup-shaped metal can and a cylindrical body 48 of refractory material which is formed by casting within the cavity of the metal can. The base of the can is formed by a circular disc 49 which is fixed coaxially to the end of the pipe 46 and which has a central aperture which is concentric with and of the same diameter as the bore of the pipe 46. The side wall of the can is formed by a cylindrical ring 51 into one end of which the disc 49 is spigotted and which projects axially from the side of the disc 49 opposite to the pipe 46. The inner surface of the ring 51 is recessed to provide axial location for the cast refractory body 48 within it. An external flange 52 is formed at the end of the ring 51 into which the disc 49 is spigotted. A throttle valve, in the form of ring 53, surrounds the cylindrical ring 51 and abuts the flange 52. Six tubes 54 are located within the burner head 12 on a common pitch circle diameter. Each tube 54 is spigotted into a respective aperture formed in the disc 49. The radius of the pitch circle of the tubes 54 is approximately half that of the burner head 12. The axial length of each tube 54 is approximately two-thirds the axial length of the cylindrical ring 51. The cylindrical body 48 is formed with six bores 55, each bore 55 being coaxial with a respective one of the tubes 54, being an extension of the bore of that tube 54 and having a diameter substantially equal to the diameter of the bore of that tube 54. The refractory body 48 has a central bore 56 which is coaxial with the bore of the pipe 46 and of which the diameter is equal to the diameter of the bore of the pipe 46.

Figure 4:
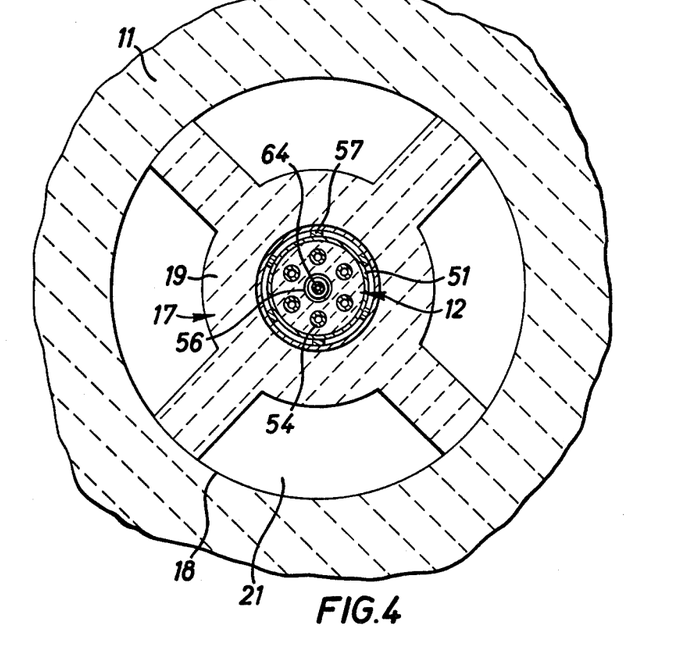
FIG. 4 is a fragmentary cross-section of part of the burner shown in FIGS. 1 to 3 taken on the line IV—IV of FIG. 1.

Spacers 57 are fixed to the outer surface of the cylindrical ring 51 at angularly spaced locations between the valve ring 53 and the end of the cylindrical ring 51 nearer the support body 17. The circumferential array of angularly spaced spacers 57 is a sliding fit within the bore of the short tube 40, the annular gap between the bore of the short tube 40 and the outer periphery of the burner head 12 being divided by the spacers 57 into angularly spaced arcuate gaps. Hence the burner head 12 is supported and located by the support body 17 through the sliding joint between the outer periphery of the burner head 12 and the short tube 40 that is carried by the support body 17, relative axial movement between the burner head 12, the middle tube 37 and the support body 17 due to differential thermal expansion being allowed by the sliding interengagement of the circumferential array of spacers 57 within the short tube 40 and the short tube 40 within the bore of the support body 17.

The pipe 46 carries a disc 50 within the third tube 39 and adjacent the end plate 23. Externally threaded studs 60, which are screwed into respective tapped holes in the end plate 23 so that they extend through the end plate 23, are coupled to the disc 50 at one end so that they can be rotated relative to the disc 50 but cannot be moved axially relative to the disc 50. Hence the relative location of the pipe 46 and the burner head 12 within the assembly 13 can be adjusted manually by manipulation of those parts of the studs 60 that project outwardly from the end plate 23.

Figure 5:
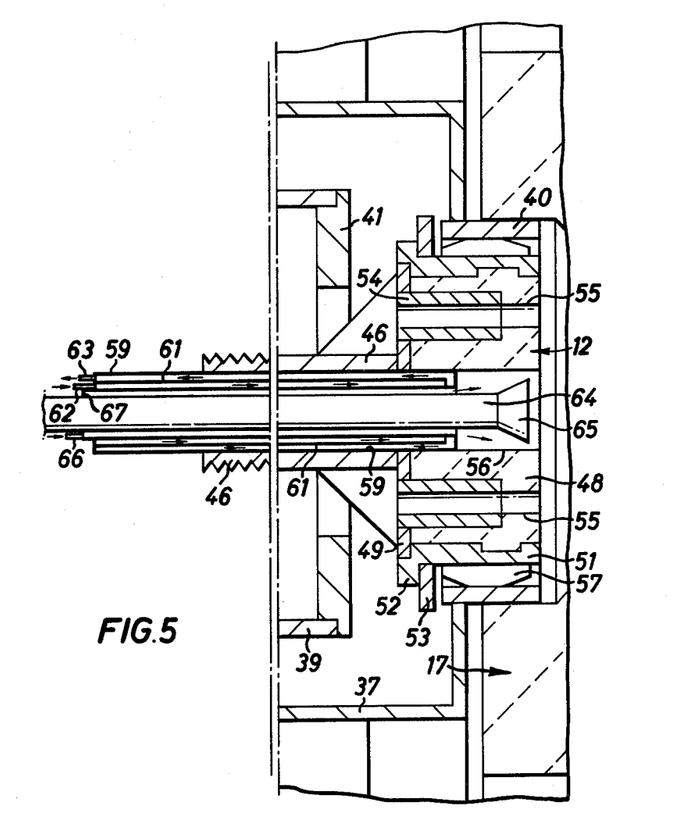
FIG. 5 is a sectioned cross-section of the oil feed lance assembly of the burner shown in FIG. 1 drawn to a larger scale than FIG. 1 with the central portion broken away for clarity.

An oil feed lance assembly 58 is a sliding fit within the bore of the fluid fuel supply pipe 46 and projects from the end of the pipe 46 remote from the burner head 12 when it is positioned within the pipe 46 for use. FIG. 5 shows that the oil feed lance assembly 58 comprises a tubular casing 59 having a hollow wall. The interior of the hollow wall forms an annular chamber which is closed at both ends. The closed annular chamber is divided by a tubular baffle 61 into inner and outer annular spaces which communicate with one another at the end of the annular chamber that is adjacent the burner head 12. The tubular baffle 61 is fixed to the closed end wall of the annular chamber at the end of the tubular casing 59 which projects from the end of the fluid fuel feed pipe 46 outside the casing 22, and is spaced from the other closed end of the annular chamber that is at the end of the tubular casing 59 adjacent the burner head 12. An air supply port 62 is provided in the end of the tubular casing 59 that is outside the casing 22 and is for connection to the same pressure source as is the air inlet 30. The supply port 62 communicates with the radially inner annular space formed within the hollow tubular casing 59. An exhaust port 63 is formed in the annular end wall of the tubular casing 59 outside the casing 22 and communicates with the radially outer annular space formed within the hollow tubular casing 59. An oil feed pipe 64 extends substantially coaxially through the bore of the tubular casing 59 and projects from either end of the casing 59. One end of the oil pipe 64 is located within the bore 56 of the burner head refractory body 48 and carries an atomiser 65 of conventional construction. The annular passage formed around the oil feed pipe 64 within the bore of the tubular casing 59 is closed at the end of the lance assembly 58 outside the casing 22 and a port 66 is formed in the closure wall 67, the port 66 being for connection to a source of compressed air which may be the same source of air as that to which the ports 30 and 62 are connected but which preferably is a separate source of compressed air at a higher pressure.

We prefer to provide an eductor (not shown) in the exhaust flue 14 adjacent the outer end of the flue 14. Such an inductor would be adapted for connection to the same source of air as the ports 30 and 62 and would be orientated so as to inject a stream of air into the exhaust flue 14 and to direct that injected stream of air towards the outlet of the exhaust flue 14 in order to induce outward fluid flow from within the cylindrical drum 31 through the exhaust flue 14.

In operation of the burner 10, air is blown through the inlet port 30 into the annular chamber 28. Such air passes from the annular chamber 28 into the cylindrical casing 22 through the aperture 25.

Air that enters the cylindrical casing 22 from the annular chamber 28 is constrained by the arcuate and limb portions 43, 44 and 45 which form the sheet metal baffle, to flow along the outer surface of the upper part of the drum 31 to the annular space that is formed within the sheet metal casing 22 between the drum 31 and the refractory body 11 where it circulates around the outer tube 36 and gravitates to the lower end of the casing 22. The air then flows below the baffle limbs 44 and 45 back along the lower part of the drum to the annular space that is formed within the annular casing 22 around the third tube 39 and between the drum 31 and the end plate 23.

Air that reaches the annular space between the drum 31 and the end plate 23 enters the annular passage that is formed between the third tube 39 and the middle tube 37 through the open end which comprises the outer portion of the circular aperture 32. Such air flows along the annular passage between the tubes 37 and 39 past the spacers 42 to the burner head 12 and constitutes the supply of combustion air to the burner head 12. Those parts of the middle tube 37 and the third tube 39 adjacent the burner head 12 are cooled by the combustion air supply to the burner head 12.

The air stream divides when it reaches the burner head 12 and follows various parallel paths through or past the burner head 12 to the aperture formed by the bore of the annular support body 17. The parallel paths comprise the six passages through the burner head 12 formed by the tubes 54 and the aligned bores 55 in the cylindrical refractory body 48, and the arcuate gaps formed between the cylindrical ring 51 of the burner head 12 and the short tube 40 by the spacers 57. Such air flow between the burner head 12 and the short tube 40 cools the burner head 12 and the components by which it is supported.

The assembly of tubes or pipes 13 and the sheet metal baffle within the annular space around the cylindrical drum 31 are arranged so that the cross-sectional area of the passages for supply of combustion air from the inlet 30 through the burner 10 of the burner head 12 is substantially constant throughout.

Oil is pumped to the atomiser 65 along the oil feed pipe 64 and compressed air from the separate compressed air source is fed along the annular space between the oil feed pipe 64 and the surrounding tubular casing 59 to the annular space around the atomiser 65 within the central bore 56 of the burner head 12. The atomiser 65 is of conventional construction and is arranged in the conventional manner to co-operate with the annular stream of compressed air passed around it to prepare oil fed to the atomiser 65 into a condition suitable for firing by converting it into an atomised spray of oil droplets and to present that atomised spray to the combustion zone for efficient combustion. The atomised spray of oil droplets prepared by the atomiser 65 mixes within the bore of the annular support body 17 with air that flows into that bore through or past the burner head 12 from the passage between the middle and third tubes 37 and 39 and the air/fuel mixture so produced is combusted to form a flame which extends into the furnace interior.

Air that flows between the burner head 12 and the short tube 40 emerges from the angularly spaced arcuate gaps as a curtain of air moving at speed and the air curtain so formed provides a fluid seal to oppose outflow between the short tube 40 and the rebated portion of the bore of the support body 17 in which it is a sliding fit from that part of the bore within which combustion occurs so that the risk of damage to the short tube 40 due to excessive heat is further reduced.

Products of combustion within the furnace interior are drawn into the burner 10 from the interior of the furnace by the action of the eductor within the tubular exhaust tube 14.

Such combustion products enter the burner 10 through the arcuate passages formed by the refractory body 11 and the support body 17 between the castellations 21, the rebated aperture end portion 18 and the right cylindrical outer surface of the main portion 19 of the support body 17. Such a stream of combustion products is then induced to flow along the annular passage formed between the middle tube 37 and firstly the bore of the refractory body 11 and then the outer tube 36. The stream of combustion products emerges from the annular passage between the middle tube 37 and the outer tube 36 into the interior of the cylindrical drum 31 from whence it is drawn through the tubular exhaust flue 14 and exhausted.

The structure of the exhaust flue 14 is cooled by the air that is introduced into the annular chamber 28 through the inlet port 30. Likewise the drum 31 and that part of the outer tube 36 that extends between the drum 31 and the annular end plate 24 is cooled by the air that flows therearound to the annular space formed between the drum 31 and the end plate 23. The air that flows to the burner head 12 along the annular passage formed between the middle tube 37 and the third tube 39 is heated further by absorbing heat from the stream of products of combustion exhausted from the interior of the furnace through the juxtaposed annular exhaust passage formed between the outer surface of the middle tube 37 and either the bore of the refractory body 11 or the outer tube 36, the heat passing through the common wall formed by the middle tube 37 which conveniently is formed of corrosion resistant metal. It will be appreciated that the structure that forms the juxtaposed air supply passage and exhaust passage that are separated by the common wall which comprises the middle tube 37 functions as heat exchange means.

Thus the temperature of the air that reaches the burner head 12 via the annular passage formed between the middle and third tubes 37 and 39 is higher than was the temperature of that air when it was introduced into the annular chamber 28 through the inlet bore 30. The extra thermal energy that follows from the temperature of the air that reaches the burner head 12 being higher than it was when it was introduced into the burner 10 through the inlet port 30 contributes to the total output of the burner 10 upon combustion. Thus some of the waste heat in the stream of combustion products exhausted from the interior of the furnace through the burner 10 is reutilised.

The valve ring 53 co-operates with the adjacent end of the short tube 40 to throttle air flow through the arcuate gaps between the burner head 12 and the short tube 40 automatically. As the temperature differential between the fluid supply 46 and the middle tube 37 increases, the distance between the valve ring 53 and the short tube 40 increases because of the differential thermal expansion, and the resistance to air flow between the burner head 12 and the short tube 40 is reduced with a consequent increase in the cooling effect of the air flow. Also the tendency for pressure to build up upstream of the burner head 12 is reduced. The relative location of the valve ring 53 and the short tube 40 can be adjusted manually by manipulation of the studs 60.

Gaseous fuel can be supplied to the burner head 12 either as well as oil supplied by the oil feed pipe or instead of such oil. In the former case the compressed air supply would be disconnected from the port 66 and a source of fuel gas under pressure would be connected to the port 66 in its place. The same modification could be employed in the latter case, the oil supply being shut off. Alternatively the oil feed lance assembly 58 could be slid out of the bore of the fluid fuel supply pipe 46 and the bore of the fluid fuel supply pipe 46 connected to a source of fuel gas under pressure so that fuel gas is passed along the passage formed by the bore of the pipe 46 to the burner head 12 for mixture with the air that is fed to the burner head 12 via the annular passage formed between the middle and third tubes 37 and 39 for combustion. Suitable fittings for connecting the bore of the fluid fuel supply pipe 46 to such a source of fuel gas under pressure when the oil feed lance assembly 58 is withdrawn may be provided.

Air introduced into the inner annular space of the hollow casing 59 through the inlet port 62 flows along that inner annular space and serves as a fluid coolant withdrawing heat from the oil feed pipe 64 and the surrounding flow of compressed air so that any tendency for the liquid oil within the pipe 64 to boil before it reaches the atomiser 65 is reduced.

The likelihood that oil fed along the oil feed pipe 64 to the atomiser 65 may become overheated before it reaches the atomiser 65 depends upon the furnace temperature and upon whether the burner 10 is being run at full rate or at a rating somewhat less than full rate. If the furnace temperature is not too high and the burner 10 is running at full rate, there may be no risk of the oil overheating so that there is no need to provide special means for extracting heat from the oil feed lance. In such circumstances a simple oil feed tube carrying an atomiser, such as the oil feed tube 64 and its atomiser 65, may be used in place of the special oil feed lance assembly 58 described above with references to the accompanying drawings. However the danger of oil overheating before it reaches the atomiser increases if the burner 10 is to be used at a rating less than full rate and the oil feed lance assembly 58 will then be required, or some other means for extracting heat from the oil being fed to the atomiser should be provided.

The cylindrical metal ring 51 that forms the outer peripheral surface of the burner head 12 may be replaced by a ring of a ceramic or other material which is capable of withstanding a greater heat than is the metal ring 51. Use of a sliding joint to support and locate the burner head 12 avoids the need for a welded joint at a location where it would be subjected to great heat and stress.

The exhaust gas flow through the burner 10 may be induced by the effect of the gases introduced into the furnace by the burner rather than by the action of the eductor described above.

The length of the overall head exchange path through the burner for heat exchange between the exhaust products of combustion and the combustion air supply is dependent upon the axial length of the tubular casing 27, amongst other factors. The length of the tubular casing 27 employed is selected in accordance with the required heat exchange path and may be replaced by another tubular casing 27 of different length to suit changing operational requirements.

The length of the portion of the outer tube 36 within the cylindrical drum 31 may be reduced so that the end of the tube 36 is much nearer to the end plate 35 than is the case with the tube 36 shown in FIG. 1.

We claim:
1. Self recuperative fluid fuel burner including:
 (a) means to supply fuel to a zone for combustion within that zone comprising means for conveying liquid fuel to the combustion zone and means adjacent the combustion zone for presenting liquid fuel so conveyed to the combustion zone in a form which is suitable for combustion within the combustion zone;
 (b) heat exchange means comprising means defining juxtaposed passage systems for bringing two fluid streams into heat exchange relationship with one another;
  (i) air supply passage means adapted to convey air via one of the juxtaposed passage systems of the heat exchange means to said zone to support combustion within that zone of fluid fuel supplied to that zone; and
  (ii) exhaust passage means for conveying away from said zone products of combustion within that zone, said exhaust passage means being adapted to convey such products of combustion through another of the juxtaposed passage systems of said heat exchange means whereby air supplied to said zone by said air supply passage means is heated within the burner before reaching said zone by heat exchange in said heat ex- change means with products of combustion within said zone;

(c) means surrounding the liquid fuel conveying means to convey heat away from same and to shield said conveying means from direct contact with combustion air heated by said heat exchange means thereby preventing overheating of the liquid fuel before it reaches said means for presenting liquid fuel to the combustion zone.

2. Burner of claim 1, wherein the surrounding means are adapted to convey gaseous fuel to said zone for combustion within said zone.

3. Burner of claim 2, wherein the liquid fuel conveying and presenting means are located removably within said surrounding means.

4. Burner of claim 1, wherein the liquid fuel presenting means includes an atomizer and means for directing a stream of compressed air past the atomizer.

5. Burner of claim 1, wherein the surrounding means includes an annular space and means for passing fluid coolant therethrough.

6. Burner of claim 1, wherein the passages of said heat exchange means, said air supply passage means and said exhaust passage means are formed by an assembly of substantially concentric tubes in sliding contact with each other to permit relative movement between them in the longitudinal direction due to differential thermal expansion, one of said tubes forming a common wall between the exhaust passage means and the air supply passage means which comprise the juxtaposed passage systems of said heat exchange means.

7. Burner of claim 6 including a burner head for mixing of air and fuel and means to support same including means forming a sliding joint between the burner head and a tubular part carried by said common wall whereby relative axial movement between the head and said wall is permitted.

8. Burner of claim 7, wherein the means forming said sliding joint include spacers positioned around an annular gap formed between the burner head and said tubular part.

9. A self recuperative fluid fuel burner including:
(a) fluid fuel supply means adapted to supply fluid fuel to a zone for combustion within that zone;
(b) heat exchange means comprising means defining juxtaposed passage systems for brining two fluid streams into heat exchange relationship with one another;
   (i) air supply passage means adapted to convey air via one of the juxtaposed passage systems of the heat exchange means to said zone to support combustion within that zone of fluid fuel supplied to that zone; and
   (ii) exhaust passage means for conveying away from said zone products of combustion within that zone, said exhaust passage means being adapted to convey such products of combustion through another of the juxtaposed passage systems of said heat exchange means whereby air supplied to said zone by said air supply passage means is heated within the burner before reaching said zone by heat exchange in said heat exchange means with products of combustion within said zone;
(c) temperature responsive value means adapted to compensate for changes in the pressure of the air flowing through the air supply passage means due to temperature changes of the heat exchange means.

10. Burner of claim 9, wherein the valve means comprises an annular part carried by the burner head and which projects radially outwardly therefrom.

11. A self recuperative fluid fuel burner including:
(a) fluid fuel supply means adapted to supply fluid fuel to a zone for combustion within that zone;
(b) heat exchange means comprising means defining juxtaposed passage systems for bringing two fluid streams into heat exchange relationship with one another;
   (i) air supply passage means adapted to convey air via one of the juxtaposed passage systems of the heat exchange means to said zone to support combustion within that zone of fluid fuel supplied to that zone and including an inlet through which fresh air for conveyance to said zone is introduced into the burner; and
   (ii) exhaust passage means for conveying away from said zone products of combustion within that zone, said exhaust passage means terminating in an exhaust flue through which products of combustion are discharged from the burner and being adapted to convey such products of combustion through another of the juxtaposed passage systems of said heat exchange means whereby air supplied to said zone by said air supply means is heated within the burner before reaching said zone by heat exchange in said heat exchange means with products of combustion within said zone;
(c) said fresh air inlet being formed in the outer wall of an annular chamber which surrounds the exhaust flue so that the exhaust flue is cooled by fresh air introduced into the annular chamber through said inlet.

12. Burner of claim 11 wherein the length of the exhaust flue and/or location of the fresh air inlet can be changed to vary the overall length of the heat exchange path between the air supply passage means and the exhaust passage means.

13. Burner of claim 11, in which the passages of said heat exchange means, said air supply passage means and said exhaust passage means are formed by an assembly of substantially concentric tubes, one of the tubes forming a common wall between the exhaust passage means and the air supply passage means which comprise the juxtaposed passage systems of said heat exchange means, wherein the common wall is the radially inner wall of the exhaust passage means and the radially outer wall of the air supply passage means, the end of the assembly of tubes that leads to said zone is encased in a block of refractory material, the remainder of said assembly of tubes projecting outwardly from the block of refractory material and carrying said exhaust flue.

14. Burner of claim 13, wherein the outer surface of said surface of said remainder is formed by a cylindrical casing from which the annular chamber projects radially and which forms an annular space around the outer wall of that part of the exhaust passage means which extends between the block of refractory material and the exhaust flue, the interior of the annular chamber being in communication with the annular space and there being baffle means within said annular space which cause air which enters said annular space to flow towards said block of refractory material and to circulate about that part of the exhaust passage means that extends between the block of refractory material and the exhaust flue before entering that part of the air supply passage means that run within said one tube through the end of said one tube that is remote from said zone and which is on the opposite side of the exhaust flue from said body of refractory material.

15. Self recuperative fluid fuel burner including:
   (a) a burner head adjacent a combustion zone;
   (b) an assembly of tubes which form passages for conveying air and fuel separately to the burner head which is adapted to effect intermixing of air and fuel fed to it to facilitate combustion of that fuel within that air in the combustion zone;
      (i) one of the tubes forming the radially outer wall of one of the passages which is adapted to convey combustion air to the burner head; and
      (ii) the radially inner wall of another of the passages which is an exhaust passage for conveying a stream of products of combustion within the combustion zone through the burner;
   (c) means for supporting and locating the burner head adjacent the combustion zone including means forming a sliding joint between the burner head and a tubular part which is carried by said one tube whereby relative axial movement between the head and said tubular part is permitted;
   (d) the arrangement being such that combustion air flowing through said one passage to the burner head is heated by heat transfer through said common wall from the stream of gaseous combustion products flowing through the other passage;
   (e) said means forming said sliding joint include spacers which are spaced angularly around an annular gap which is formed between the outer periphery of the burner head and said tubular part;
   (f) each of the spacers being fixed to one of the burner head and said tubular part and being engaged slidably with the other of the burner head, and said tubular part;
   (g) the group of angularly spaced gaps between the spacers being in communication with said one passage so that, when the burner is in operation, part of the air supply to the combustion zone via said one passage is directed through said group of angularly spaced gaps.

16. Burner of claim 15, wherein one of said burner head and said tubular part carries a valve which co-operates with a corresponding portion of the other of said burner head and said tubular part to throttle air flow from said one passage through said group of angularly spaced gaps, the arrangement being such that the restriction to such air flow through the group of angularly spaced gaps provided by the throttling action of said valve and the co-operating portion reduces as the temperature differential between the passage for conveying fuel to the burner head and said one tube increases.

17. Burner of claim 16, wherein the valve comprises an annular part which is carried by the burner head and which projects radially outwardly from the outer periphery of the burner head, and the co-operating part comprises an annular surface formed by an adjacent end of said tubular part.

18. Burner of claim 16, wherein manually operable means are provided for adjusting the relative locations of said valve and said co-operating part.

19. In a method of operating a burner wherein:
   (i) combustion air is passed along passage means of the burner to a combustion zone of the burner,
   (ii) liquid fuel is burned in said air in the combustion zone; and
   (iii) heat from products of such combustion is transferred to said air passing along said passage means so as to increase the heat output of the burner, the improvement which comprises preventing overheating of the liquid fuel before it reaches the combustion zone by conveying heat away from liquid fuel being conveyed through the burner to the combustion zone to be burnt in the combustion zone and shielding the liquid fuel being conveyed from direct contact with heated combustion air.

20. In a method of operating a burner wherein:
   (i) combustion air is passed along passage means of the burner of a combustion zone of the burner;
   (ii) fluid fuel is burned in said air in the combustion zone; and
   (iii) heat from the products of combustion is transferred to said air passing along said passage means so as to increase the heat output of the burner;
   (iv) the improvement which comprises compensating for changes in the pressure of the combustion air passing along the passage means by varying the amount of air passed to the combustion zone in response to changes in temperature of the products of combustion.

21. In a method of operating a burner wherein:
   (i) combustion air is passed from an inlet along passage means of the burner to a combustion zone of the burner;
   (ii) fluid fuel is burned in said air in the combustion zone; and
   (iii) the products of combustion are discharged from an exhaust flue and heat from said products is transferred to said air passing along said passage means so as to increase the heat output of the burner;
   (iv) the improvement which comprises varying the overall length of the passage means by changing the length of the exhaust flue and/or the location of the compressed air inlet.

* * * * *